(12) United States Patent
Deneszczuk et al.

(10) Patent No.: US 9,365,118 B2
(45) Date of Patent: Jun. 14, 2016

(54) HIGH VOLTAGE PROTECTION SYSTEM

(71) Applicant: GM GLOBAL TECHNOLOGY OPERATIONS LLC, Detroit, MI (US)

(72) Inventors: William C Deneszczuk, Saline, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 455 days.

(21) Appl. No.: 13/923,785

(22) Filed: Jun. 21, 2013

(65) Prior Publication Data
US 2014/0375116 A1 Dec. 25, 2014

(51) Int. Cl.
*B60L 1/00* (2006.01)
*B60L 3/04* (2006.01)
*B60L 3/00* (2006.01)

(52) U.S. Cl.
CPC .. *B60L 3/04* (2013.01); *B60L 3/003* (2013.01)

(58) Field of Classification Search
CPC .................................... B60L 3/04; B60L 3/003
USPC ........................................................... 307/9.1
See application file for complete search history.

(56) References Cited

U.S. PATENT DOCUMENTS

| 2004/0134227 A1* | 7/2004 | Kolda | B60H 1/3232 62/508 |
| 2005/0167172 A1* | 8/2005 | Fernandez | B60L 1/00 180/65.8 |
| 2009/0073624 A1* | 3/2009 | Scholer | B60L 3/0069 361/88 |
| 2011/0062798 A1* | 3/2011 | Tarchinski | B60L 3/00 307/328 |
| 2011/0133575 A1* | 6/2011 | Arashi | B60H 1/3229 307/326 |
| 2013/0111971 A1* | 5/2013 | Pudas | B82Y 15/00 73/12.01 |

FOREIGN PATENT DOCUMENTS

| CN | 202253526 U | 5/2012 |
| CN | 102800637 A | 11/2012 |
| DE | 102004056863 A1 | 6/2006 |

* cited by examiner

*Primary Examiner* — Jared Fureman
*Assistant Examiner* — Duc M Pham
(74) *Attorney, Agent, or Firm* — Quinn Law Group, PLLC

(57) ABSTRACT

An electronics housing for a high voltage system of a vehicle defines an interior region, and includes a connection header wall having a window. An optical proximity sensor is disposed within the interior region of the electronics housing, adjacent the window. A cover is removably attached to the electronics housing adjacent an exterior surface of the connection header wall. The cover is disposed over the window. The optical proximity sensor is operable to sense the presence of the cover through the window when the cover is attached to the electronics housing.

14 Claims, 2 Drawing Sheets

HIGH VOLTAGE PROTECTION SYSTEM

TECHNICAL FIELD

The invention generally relates to an inverter module in a high voltage interlock loop system for a vehicle.

BACKGROUND

Vehicles, such as hybrid or fully electric vehicles, may include a high voltage system. Wires transmit an electric current between various components of the high voltage system. The wires may be attached to the different components with exposed terminals. These exposed terminals are covered with a cover to prevent inadvertent contact.

SUMMARY

An inverter module for a high voltage system is provided. The inverter module includes an electronics housing that defines an interior region, and includes a connection header wall having a window. An optical proximity sensor is disposed within the interior region of the electronics housing, adjacent the window. A cover is removably attached to the electronics housing adjacent an exterior surface of the connection header wall. The cover is disposed over the window. The optical proximity sensor is operable to sense the presence of the cover through the window when the cover is attached to the electronics housing.

A high voltage system for a vehicle is also provided. The high voltage system includes an electronics housing that defines an interior region, and includes a connection header wall having a window. A terminal block is attached to and supported by the connection header wall of the housing. At least one high voltage connector is attached to the terminal block. A cover is removably attached to the electronics housing adjacent an exterior surface of the connection header wall. The cover is disposed over the window. The at least one high voltage connector is disposed between the cover and the exterior surface of the connection header wall. An optical proximity sensor is disposed within the interior region of the electronics housing adjacent the window. The optical proximity sensor is operable to sense the presence of the cover through the window when the cover is attached to the electronics housing.

A method of operating a high voltage system of a vehicle is also provided. The method includes emitting a signal from a transmitting portion of an optical proximity sensor. The optical proximity sensor is disposed within an interior region of an electronics housing. The signal is emitted through a window defined by a wall of the electronics housing. The signal emitted from the transmitting portion is reflected back through the window and toward a receiving portion of the optical proximity sensor. The signal is reflected by a reflector disposed on an underside of a cover attached to the electronics housing. The reflected signal is detected with the receiving portion to indicate the presence of the cover. A current in the high voltage system is disconnected when the receiving portion fails to detect the reflected signal.

Accordingly, the cover covers the high voltage connectors. The optical proximity sensor senses the presence of the cover through the window of the electronics housing. If the proximity sensor fails to detect the presence of the cover, then the high voltage system may disconnect any electrical current flowing through the high voltage connectors to prevent any inadvertent contact with the high voltage connectors. The optical proximity sensor is disposed within the interior region of the electronics housing, thereby eliminating any parts external to the electronics housing. The optical proximity sensor may be directly mounted on and electrically connected to a circuit board within the electronics housing to directly communicate via the circuitry of the circuit board with a processor for controlling the high voltage system, thereby eliminating any indirect electrical connections between the optical proximity sensor and the processor.

The above features and advantages and other features and advantages of the present invention are readily apparent from the following detailed description of the best modes for carrying out the invention when taken in connection with the accompanying drawings.

DETAILED DESCRIPTION

Figure 1:
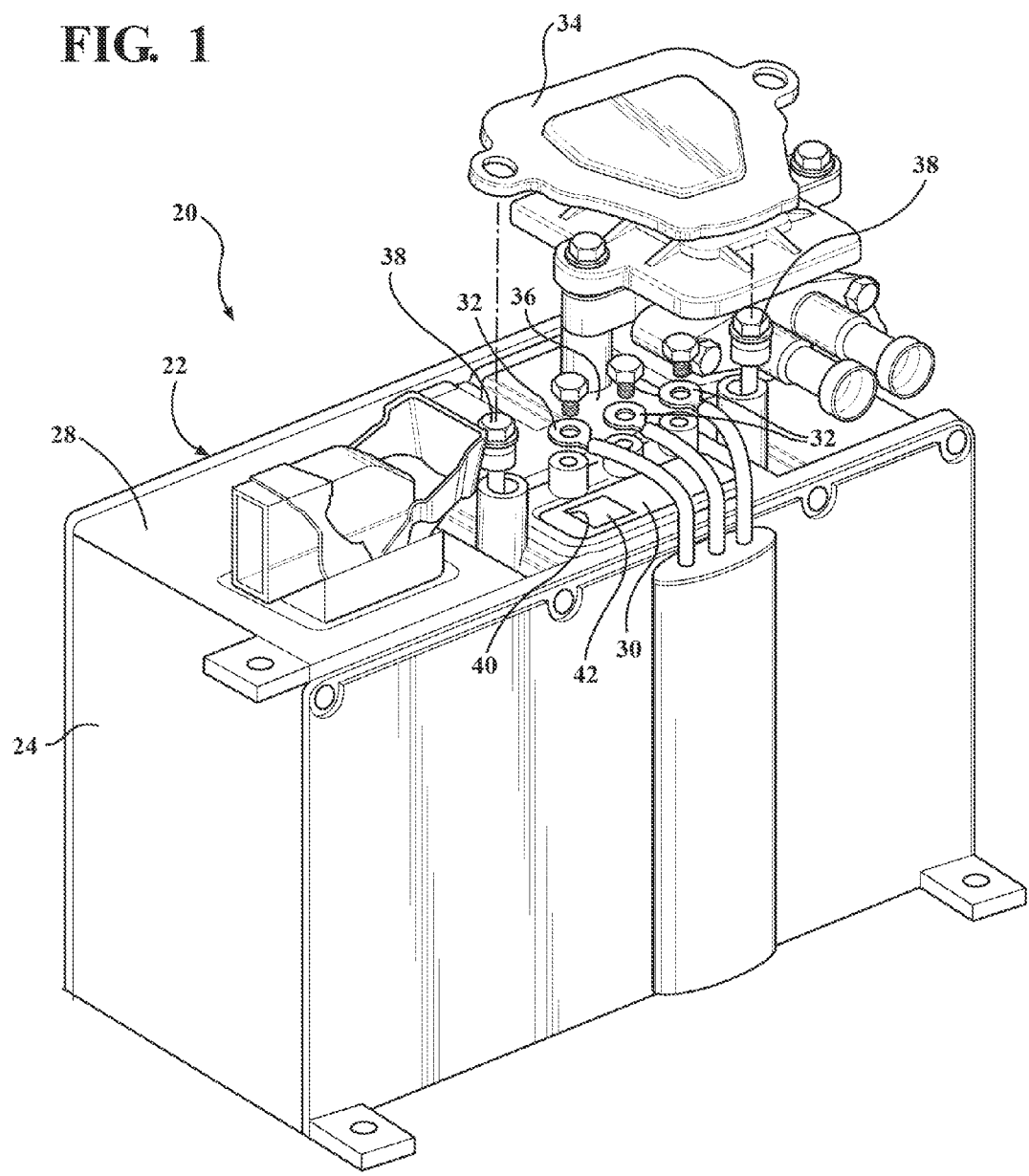
FIG. 1 is a schematic partially exploded perspective view of an inverter module of a high voltage system for a vehicle.
Figure 2:
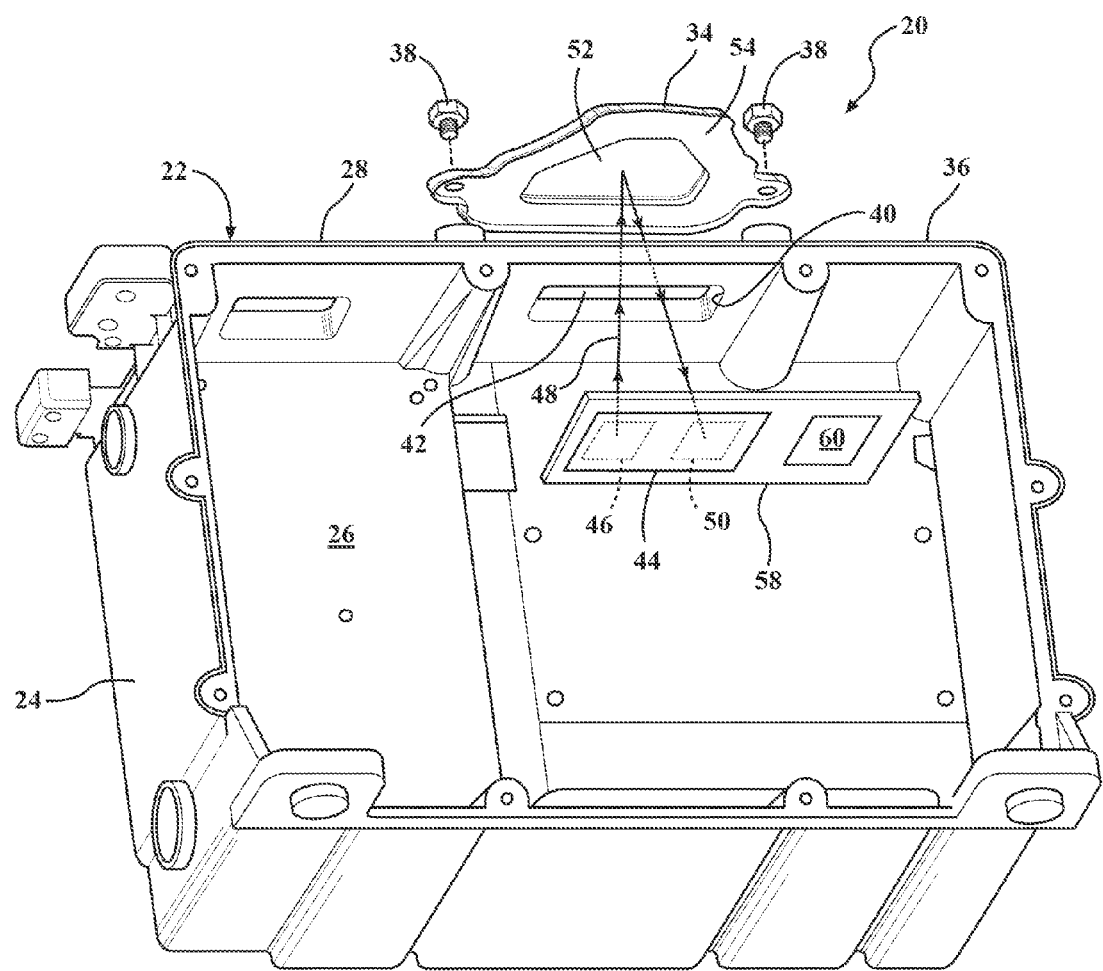
FIG. 2 is a schematic exploded perspective view of an electronics housing of the inverter module

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a high voltage system is generally shown at 20. The high voltage system 20 is for a vehicle, and may include but is not limited to a high voltage drive system of a hybrid vehicle. If the high voltage system 20 detects an exposed component, such as an uncovered high voltage terminal or connector, then the high voltage system 20 may disconnect or disable an electrical current in the high voltage system 20 to prevent any inadvertent contact with the exposed components.

The high voltage system 20 may include an inverter module 22. The inverter module 22 includes an electronics housing 24 that defines an interior region 26. While the invention is described herein with reference to the electronics housing 24 of the inverter module 22, it should be appreciated that aspects of the invention may apply to other electronics housings other than the exemplary inverter module 22 described herein. The electronics housing 24 supports the various different components of the inverter module 22. Because the specific operation of the inverter module 22 is not relevant to the detailed description of the invention, the specific components and operation thereof are not described in detail herein.

The electronics housing 24 includes a plurality of walls defining a substantially rectangular container. At least one of the walls of the electronics housing 24 may be removable to provide access to the interior region 26 that is defined between the plurality of walls. At least one of the walls of the electronics housing 24 defines a connection header, hereinafter referred to as a connection header wall 28. A terminal block 30 is attached to and supported by the connection header wall 28 of the housing. At least one high voltage connector 32 is attached to the terminal block 30. The terminal block 30 connects the high voltage connector 32 with the various components of the inverter module 22 disposed within the interior region 26 of the electronics housing 24.

A cover 34 is removably attached to the electronics housing 24. The cover 34 is disposed adjacent to an exterior surface 36 of the connection header wall 28. The high voltage connectors 32 are disposed between the cover 34 and the exterior surface 36 of the connection header wall 28, such that the cover 34 is disposed over the high voltage connectors 32 to prevent any inadvertent contact with the high voltage connectors 32. The cover 34 may be attached to the electronics housing 24 in any suitable manner that allows the cover 34 to be removed to provide access to the high voltage connectors 32. For example and as shown, the cover 34 is attached to the electronics housing 24 by a pair of threaded fasteners 38 in threaded engagement with the connection header wall 28.

The connection header wall 28 includes a window 40. The cover 34 is disposed directly over the window 40 such that the cover 34 extends over the window 40. The electronics housing 24 may include a transparent pane 42 that is disposed over the window 40. The transparent pane 42 is disposed in sealing engagement with the connection header wall 28 to seal the interior region 26 of the electronics housing 24, about a perimeter of the window 40.

An optical proximity sensor 44 is disposed within the interior region 26 of the electronics housing 24, adjacent the window 40. The optical proximity sensor 44 includes a transmitting portion 46 operable to emit a transmitted signal 48, and a receiving portion 50 operable to receive the transmitted signal 48. The optical proximity sensor 44 may include any sensor capable of emitting a signal and detecting the emitted signal from a reflective target 52. For example, the transmitting portion 46 of the optical proximity sensor 44 may include but is not limited to a Light Emitting Diode (LED) for emitting a light signal, and the receiving portion 50 of the optical proximity sensor 44 may include but is not limited to a light sensor for detecting the presence of the light emitted from the LED. The cover 34 includes a target 52 that is disposed on an underside 54 of the cover 34 and positioned over the window 40 of the electronics housing 24. The target 52 is reflective, and is operable to reflect the transmitted signal 48 from the transmitting portion 46 of the optical proximity sensor 44.

The cover 34, and more specifically the target 52 on the underside 54 of the cover 34, is spaced from the exterior surface 36 of the connection header wall 28 of the electronics housing 24 a separation distance. Preferably, the separation distance is equal to or less than 50 mm, and more preferable is between the range of 15 mm and 40 mm. However, the separation distance is dependent upon the specific type and/or style of optical proximity sensor 44 used, and the distance between the transmitting portion 46 and the connection header wall 28. As such, the separation distance may be greater than the preferred maximum noted above, or less than the lower limit of the range noted above.

The optical proximity sensor 44 is operable to sense the presence of the cover 34 through the window 40 when the cover 34 is attached to the electronics housing 24. The transmitting portion 46 of the optical proximity sensor 44 transmits the transmitted signal 48 through the window 40 and onto the target 52. The target 52 reflects the transmitted signal 48 back through the window 40 and toward the receiving portion 50 of the optical proximity sensor 44. The receiving portion 50 receives and/or detects the reflected transmitted signal 48, thereby indicating the presence of the cover 34 over the high voltage connectors 32. The failure of the receiving portion 50 to receive the transmitted signal 48 indicates the absence of the cover 34 over the high voltage connectors 32. If the electronics housing 24 is equipped with the transparent pane 42, then it should be appreciated that the transmitted signal 48 passes through the transparent pane 42 onto the target 52, and is reflected by the target 52 through the transparent pane 42 back to the receiving portion 50.

Preferably, the inverter module 22 includes a circuit board 58 that is disposed within the interior region 26 of the electronics housing 24. The optical proximity sensor 44 may be directly mounted on and electrically connected to the circuit board 58, thereby eliminating any wired connections between the optical proximity sensor 44 and the circuit board 58. The inverter module 22 may include processor 60 that is also directly mounted on and electronically connected to the circuit board 58. Accordingly, the optical proximity sensor 44 and the processor 60 may communicate directly through circuitry of the circuit board 58.

The processor 60 is operable to receive a signal or data from the optical proximity sensor 44 indicating the presence of the cover 34, or the absence of the cover 34. Data from the optical proximity sensor 44 related to the detection of the reflected signal is communicated to the processor 60 through the circuitry of the circuit board 58. The processor 60 is also operable to disable or disconnect a current from flowing through the high voltage connectors 32 in response to the signal from the optical proximity sensor 44 indicating the absence of the cover 34. By disconnecting the high voltage connectors 32 when the cover 34 is absent, the high voltage system 20 prevents any inadvertent contact with the high voltage connectors 32. The manner in which the processor 60 disconnects the electric current in the high voltage system is known to those skilled in the high voltage system 20 art, and is therefore not described in detail herein.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An inverter module for a high voltage system of a vehicle, the inverter module comprising:
    an electronics housing defining an interior region and including a connection header wall having a window;
    an optical proximity sensor disposed within the interior region of the electronics housing adjacent the window; and
    a cover removably attached to the electronics housing adjacent an exterior surface of the connection header wall and disposed over the window;
    wherein the optical proximity sensor is operable to sense the presence of the cover through the window when the cover is attached to the electronics housing;
    wherein the cover includes a target disposed on an underside of the cover and positioned over the window of the electronics housing; and
    wherein the cover and the target are spaced from the exterior surface of the connection header wall of the electronics housing a separation distance.

2. An inverter module as set forth in claim 1 further comprising a circuit board disposed within the interior region of the electronics housing, wherein the optical proximity sensor is directly mounted on and electrically connected to the circuit board.

3. An inverter module as set forth in claim 2 further comprising a processor directly mounted on and electronically connected to the circuit board such that the optical proximity sensor and the processor may communicate directly through circuitry of the circuit board.

4. An inverter module as set forth in claim 1 wherein the separation distance is equal to or less than 50 mm.

5. An inverter module as set forth in claim 1 wherein the target is reflective.

6. An inverter module as set forth in claim 5 wherein the optical proximity sensor includes a transmitting portion operable to emit a signal, and a receiving portion operable to receive the signal, wherein the transmitting portion transmits the signal through the window onto the target, and wherein the target reflects the signal through the window toward the receiving portion.

7. An inverter module as set forth in claim 1 wherein the electronics housing includes a transparent pane disposed over the window and in sealing engagement with the connection header wall to seal the interior region of the electronics housing.

8. A high voltage system for a vehicle, the high voltage system comprising:
   an electronics housing defining an interior region and including a connection header wall having a window;
   a terminal block attached to and supported by the connection header wall of the housing;
   at least one high voltage connector attached to the terminal block;
   a cover removably attached to the electronics housing adjacent an exterior surface of the connection header wall and disposed over the window, with the at least one high voltage connector disposed between the cover and the exterior surface of the connection header wall; and
   an optical proximity sensor disposed within the interior region of the electronics housing adjacent the window;
   wherein the optical proximity sensor is operable to sense the presence of the cover through the window when the cover is attached to the electronics housing;
   wherein the cover includes a target disposed on an underside of the cover and positioned over the window of the electronics housing; and
   wherein the cover and the target are spaced from the exterior surface of the connection header wall of the electronics housing a separation distance.

9. A high voltage system as set forth in claim 8 wherein the target is reflective.

10. A high voltage system as set forth in claim 9 wherein the optical proximity sensor includes a transmitting portion operable to emit a signal, and a receiving portion operable to receive the signal, wherein the transmitting portion transmits the signal through the window onto the target, and wherein the target reflects the signal through the window toward the receiving portion.

11. A high voltage interlock loop system as set forth in claim 8 wherein the separation distance is equal to or less than 50 mm.

12. A high voltage system as set forth in claim 8 wherein the electronics housing includes a transparent pane disposed over the window and in sealing engagement with the connection header wall to seal the interior region of the electronics housing.

13. A high voltage system as set forth in claim 8 further comprising a circuit board disposed within the interior region of the electronics housing, wherein the optical proximity sensor is directly mounted on and electrically connected to the circuit board.

14. A high voltage system as set forth in claim 13 wherein the circuit board includes a processor operable to receive a signal from the optical proximity sensor indicating the presence of the cover or the absence of the cover, wherein the processor is operable to disconnect a high voltage current in the high voltage connector in response to the signal from the optical proximity sensor indicating the absence of the cover.

* * * * *